(12) United States Patent
Nagasaki et al.

(10) Patent No.: US 10,963,056 B2
(45) Date of Patent: Mar. 30, 2021

(54) TOUCH PANEL AND DISPLAY APPARATUS

(71) Applicant: KYOCERA Corporation, Kyoto (JP)

(72) Inventors: Kouichi Nagasaki, Yasu (JP); Takashi Shimizu, Kusatsu (JP); Fumiaki Nakao, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 16/482,182

(22) PCT Filed: Jan. 24, 2018

(86) PCT No.: PCT/JP2018/002156
§ 371 (c)(1),
(2) Date: Jul. 30, 2019

(87) PCT Pub. No.: WO2018/143035
PCT Pub. Date: Aug. 9, 2018

(65) Prior Publication Data
US 2019/0339780 A1  Nov. 7, 2019

(30) Foreign Application Priority Data

Jan. 31, 2017  (JP) .............................. JP2017-016338

(51) Int. Cl.
*G06F 3/01* (2006.01)
*G02F 1/1333* (2006.01)
*G06F 3/041* (2006.01)
*H01H 3/00* (2006.01)

(52) U.S. Cl.
CPC .......... *G06F 3/016* (2013.01); *G02F 1/13338* (2013.01); *G02F 1/133308* (2013.01); *G06F 3/041* (2013.01); *H01H 2003/008* (2013.01)

(58) Field of Classification Search
CPC .... G06F 3/016; G06F 3/041; G02F 1/133308; G02F 1/13338; G02F 2001/133322; G02F 2001/133317; H01H 2003/008
See application file for complete search history.

(56) References Cited

U.S. PATENT DOCUMENTS

| 8,199,083 B2 | 6/2012 | Fukunaga et al. |
| 9,734,677 B2 | 8/2017 | Kono et al. |
| 2009/0121848 A1* | 5/2009 | Yuk ..................... G06F 3/03547 340/407.2 |

(Continued)

FOREIGN PATENT DOCUMENTS

| JP | 2009-151039 A | 7/2009 |
| JP | 2014-006672 A | 1/2014 |

(Continued)

*Primary Examiner* — Ariel A Balaoing
(74) *Attorney, Agent, or Firm* — Volpe Koenig (57) ABSTRACT

A touch panel and a display apparatus include a backlight apparatus serving as a supporting substrate, a transparent protective plate that is arranged spaced apart from the backlight apparatus and includes an operating surface on an opposite side of the backlight apparatus; a plurality of vibrators for vibrating the transparent protective plate; and a resilient supporting member arranged between the backlight apparatus and the transparent protective plate to support the transparent protective plate and extend and contract diagonally across a thickness direction of the transparent protective plate.

7 Claims, 9 Drawing Sheets

(56) References Cited

U.S. PATENT DOCUMENTS

| | | |
|---|---|---|
| 2009/0161051 A1 | 6/2009 | Fukunaga et al. |
| 2009/0237607 A1* | 9/2009 | Hosokawa ............ G02F 1/1341 349/153 |
| 2011/0025480 A1* | 2/2011 | Hwang ............... H04M 19/047 340/407.1 |
| 2013/0135242 A1* | 5/2013 | Tsurusaki ................ G06F 3/016 345/173 |
| 2013/0154984 A1* | 6/2013 | Gondo .................... G06F 1/169 345/173 |
| 2014/0176318 A1* | 6/2014 | Kono ...................... G06F 3/041 340/407.2 |
| 2014/0333181 A1* | 11/2014 | Wang ..................... G06F 3/167 310/328 |
| 2015/0187189 A1 | 7/2015 | Kono et al. |
| 2016/0259414 A1* | 9/2016 | Fujii ....................... G06F 3/016 |

FOREIGN PATENT DOCUMENTS

| | | |
|---|---|---|
| JP | 2015-212977 A | 11/2015 |
| JP | 2016-038697 A | 3/2016 |

* cited by examiner

TOUCH PANEL AND DISPLAY APPARATUS

TECHNICAL FIELD

The present disclosure relates to a touch panel and a display apparatus.

BACKGROUND

Recently, it is popular for mobile information apparatuses such as smartphones and tablet PCs to be equipped with touch panels which provide a tactile sensation by vibrating. Further, the touch panels as described above are increasingly mounted on various consumer appliances including home appliances such as microwaves, televisions, and lighting equipment, as well as various industrial equipment such as automated teller machines, automatic ticket machines, and vending machines.

A typical conventional technology is described in, for example, PTL 1 set forth below. PTL 1 discloses a tactile sensation providing apparatus equipped with a panel such as a touch panel. This tactile sensation providing apparatus includes a tactile sensation providing unit configured to provide a tactile sensation by vibrating, and a pressure controller configured to control air pressure in a space located on an opposite side of a tactile sensation providing surface of the tactile sensation providing unit when the tactile sensation providing unit vibrates. Here, the pressure controller includes a pressure control vent.

CITATION LIST

Patent Literature
PTL 1: JP-A-2014-6672

SUMMARY

Technical Problem

In the conventional technology as described above, for example, it is desirable to be able to increase the kinds of tactile sensation perceivable by the user due to changes in the vibration of a vibrator and to increase the information that can be conveyed to the user through tactile sensation. It is also desirable to reduce cost by avoiding an increase in the number of vibrators while the kinds of tactile sensation are increase by increasing the vibration directions. It is advantageous for a touch panel and a display apparatus to be able to generate various vibrations without increasing the number of vibrators.

Solution to Problem

A touch panel according to an embodiment comprising:
a supporting substrate;
a protective plate that is arranged spaced apart from the supporting substrate and includes an operating surface facing away from the supporting substrate;
a plurality of vibrators for vibrating the protective plate; and
a resilient supporting member arranged between the supporting substrate and the protective plate to support the protective plate and extend and contract diagonally across a thickness direction of the protective plate.

A display apparatus according to an embodiment comprising:

the touch panel described above in which the protective plate is transparent; and
a display panel arranged between the protective plate and the supporting substrate.

Advantageous Effect

The touch panel and the display apparatus according to an embodiment can generate various vibrations without an increase in the number of vibrators. Thus, the touch panel and the display apparatus according to the embodiment can deliver various tactile sensations to a user at a low cost.

BRIEF DESCRIPTION OF THE DRAWINGS

In the accompanying drawings.

DETAILED DESCRIPTION

First Embodiment

Figure 1:
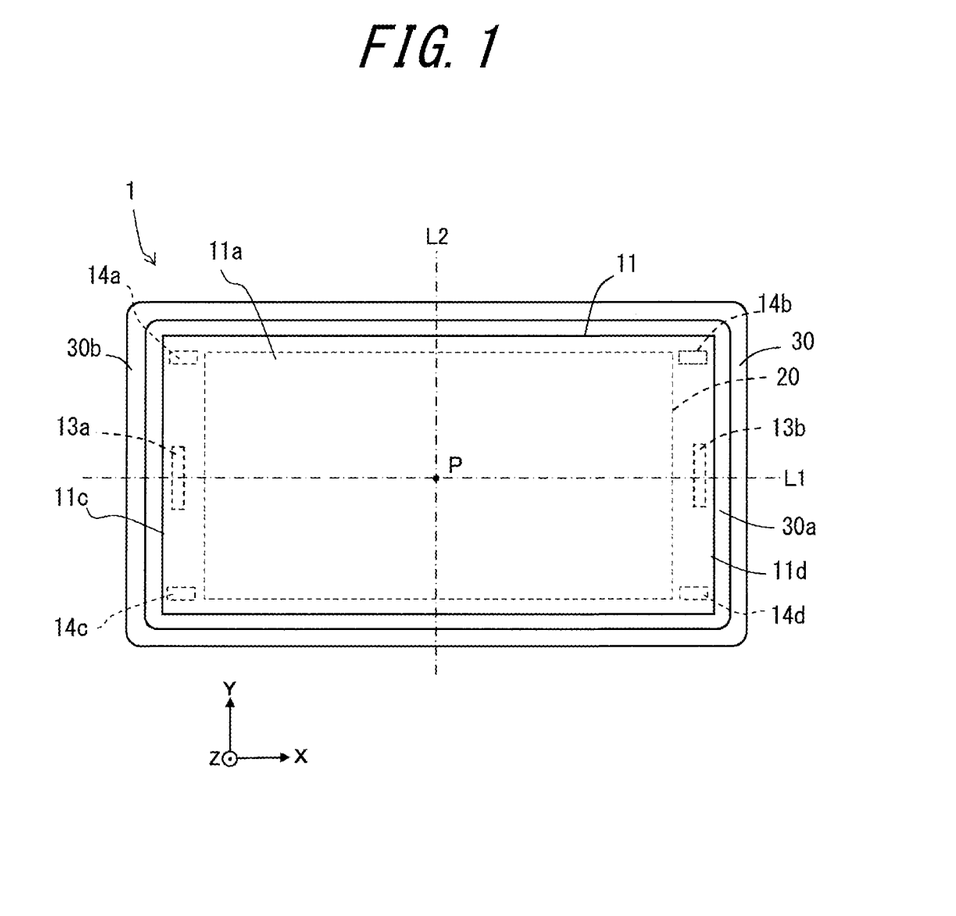
FIG. 1 is a plan view illustrating a display apparatus according to an example of a first embodiment.
Figure 2:
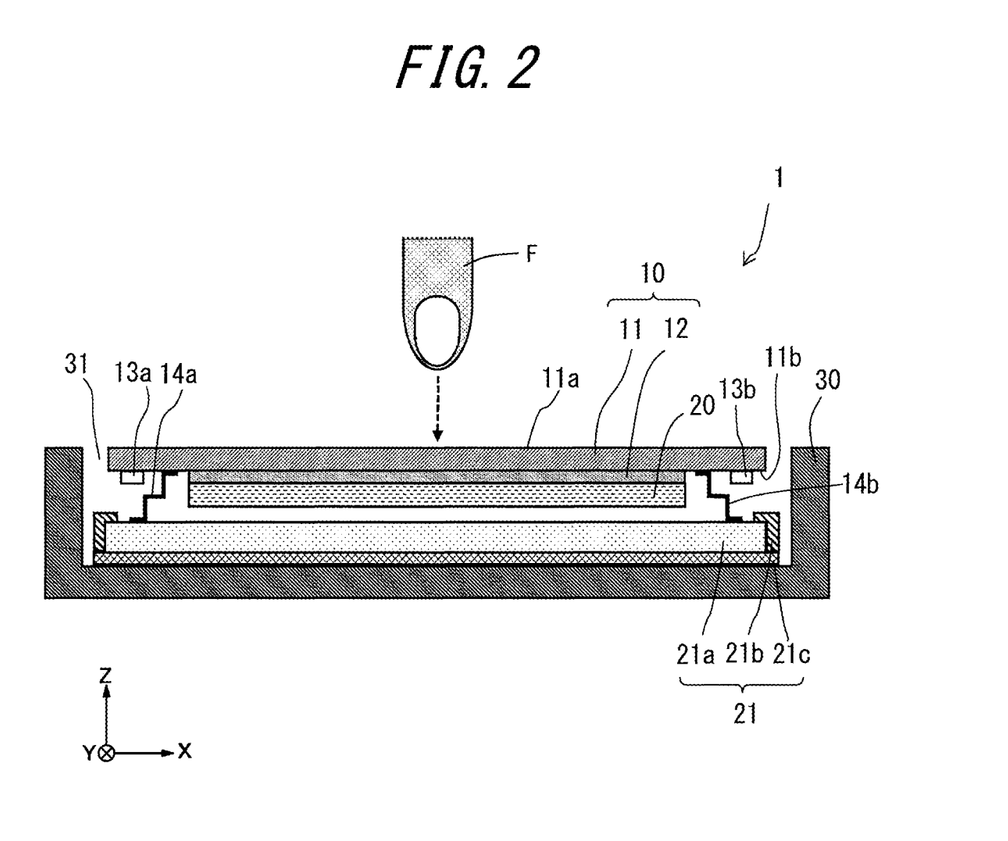
FIG. 2 is a cross-sectional diagram illustrating the display apparatus according to the example of the first embodiment.

FIG. 1 is a plan view illustrating a display apparatus according to an example of a first embodiment. FIG. 2 is a cross-sectional diagram illustrating the display apparatus according to the example of the first embodiment. As illustrated in FIG. 1 and FIG. 2, in a liquid crystal display apparatus 1, a liquid crystal display panel 20 serving as a display panel is arranged on a rear surface of a transparent touch panel 10. A backlight apparatus 21 is arranged on the rear surface of the liquid crystal display panel 20. A housing 30 encloses the touch panel 10, the liquid crystal display panel 20, and the backlight apparatus 21.

The touch panel 10 includes, for example, a transparent protective plate 11 having a contact detection unit 12. The transparent protective plate 11 is arranged in parallel with a light-guide plate 21a of the backlight apparatus 21 serving as a supporting substrate. The transparent protective plate 11 is arranged being spaced apart from the light-guide plate 21a in its thickness direction. In the touch panel 10, an operating surface 11a of the transparent protective plate 11 is positioned facing away from the light-guide plate 21a of the backlight apparatus 21. The contact detection unit 12 is arranged on a rear surface 11b on the opposite side of the operating surface 11a of the transparent protective plate 11.

The transparent protective plate 11 may be a rectangular glass plate or plastic plate. The transparent protective plate 11 includes the operating surface 11a configured to operate in response to contact made by an operator using a finger F or a touch pen. A contact detection unit 12 is arranged on the rear surface 11b on the opposite side of the operating surface 11a of the transparent protective plate 11. The contact detection unit 12 is a rectangular thin film which is smaller in size than the transparent protective plate 11. The contact detection unit 12 can detect a position of the finger F or the touch pen in contact with the operating surface 11a. As a detection method, a capacitive type or a resistive type may be employed. According to the present embodiment, the contact detection unit 12 is arranged between the transparent protective plate 11 and the liquid crystal display panel 20. However, the contact detection unit 12 may be incorporated into the liquid crystal display panel 20.

On the rear surface 11b of the transparent protective plate 11, a plurality of vibrators 13a and 13b (collectively referred to as vibrators 13, omitting the subscripts a and b) are attached. For example, the vibrators 13a and 13b are located along two opposite sides of the rectangular shaped operating surface 11a of the transparent protective plate 11. In a plan view (FIG. 1), the vibrators 13a and 13b are arranged in a point symmetrical manner with respect to a center P of the operating surface 11a of the transparent protective plate 11 having the rectangular shape. The vibrators 13a and 13b may be in direct contact with the transparent protective plate 11 so as to directly transmit vibration thereto. As described later, however, the vibrators 13a and 13b may indirectly transmit vibration to the transparent protective plate 11 via another member.

The vibrators 13 may be formed from a piezoelectric body such as a ceramic piezoelectric body or a polymeric piezoelectric body, an eccentric motor, a linear vibrator, or a shape-memory alloy. As a material of the ceramic piezoelectric body, barium titanate ($BaTiO_3$), lead titanate ($PbTiO_3$), lead zirconate titanate (Pb [Zrx, $Ti_{1-x}$]O3, 0<x<1, mixed crystal: PZT), potassium niobate ($KNbO_3$), lithium niobate ($LiNbO_3$), lithium tantalate ($LiTaO_3$), sodium tungstate ($Na_xWO_3$), zinc oxide (ZnO, $Zn_2O_3$), $Ba_2NaNb_5O_5$, $Pb_2KNb_5O_{15}$, lithium tetraborate ($Li_2B_4O_7$), sodium potassium niobate ((K, Na) $NbO_3$), bismuth sodium titanate ($Na_{0.5}Bi_{0.5}TiO_3$), or the like may be employed. As a material of the polymeric piezoelectric member, polyvinylidene fluoride (1, 1-2 fluoride ethane polymer: PVDF) or the like may be employed.

The frequencies of the vibrations generated by the vibrators 13 is approximately 30 Hz to 300 Hz. As a tactile vibration that provides a good tactile sensation to a human finger, the frequency may be approximately 150 Hz to 250 Hz. The amplitude of the vibration is approximately 30 μm to 1000 μm. In order to generate a tactile vibration that provides a good tactile sensation to a human finger, the amplitude may be approximately 50 μm to 150 μm. The vibrators 13 may have a rectangular, cubic, plate-like, or columnar shape including a cylindrical shape. The liquid crystal display panel 20 and the backlight apparatus 21 may be arranged in a manner such as to avoid inhibiting vibration of the vibrators 13. For that reason, the size (height) of the space between the liquid crystal display panel 20 and the backlight apparatus 21 may be approximately 1 mm to 5 mm, and preferably 1 mm to 3 mm from the viewpoint of reducing thickness.

The liquid crystal display panel 20 serving as the display panel is arranged on the surface of the transparent protective plate 11 which is on the opposite side from the operating surface 11a. According to the present embodiment, the display surface of the liquid crystal display panel 20 is in contact with the contact detection unit 12. The backlight apparatus 21 is arranged being spaced apart from the surface of the liquid crystal display panel 20 which is on the opposite side from the display surface. The backlight apparatus 21 includes a light-guide plate 21a, a frame 21b arranged at the periphery of the light-guide plate 21a, and a conductive plate 21c that is used for mounting the light-guide plate 21a and serves also as a ground conductor. The backlight apparatus 21 is configured to illuminate the liquid crystal display panel 20 via the light-guide plate 21a with light from a light source incorporated in the backlight apparatus 21. The frame 21b and the conductive plate 21c may be made of a metal such as aluminum. The display panel may be configured as, other than the liquid crystal panel, an organic ELD (Electroluminescent Display) panel or a light emitting diode (LED) panel. Because of the self-light-emitting property of the organic EL (Electro Luminescence) display panel and the light emitting diode (LED) display panel, the backlight apparatus may be omitted when one of them is used.

The backlight apparatus 21 is fixedly mounted on a bottom surface 30a of the housing 30. A frame portion 30b is provided at the periphery of the bottom surface 30a of the housing 30 and protects the side surfaces of the backlight apparatus 21, the liquid crystal display panel 20, and the touch panel 10. The housing 30 may be made of, for example, plastic or metal.

A resilient supporting member is arranged on the rear surface 11b of the transparent protective plate 11 of the touch panel 10. According to the present embodiment, resilient supporting members 14a, 14b, 14c, and 14d (collectively referred to as resilient supporting members 14, omitting the subscripts a, b, c, and d) are arranged at the respective corners of the rectangular shaped transparent protective plate 11. The resilient supporting members 14 are arranged between the light-guide plate 21a of the backlight apparatus 21 serving as the support substrate and the transparent protective plate 11, and support the transparent protective plate 11. Each of the resilient supporting members 14 has one end in contact with the light-guide plate 21a and the other end in contact with the rear surface 11b of the transparent protective plate 11. The resilient supporting members 14 are fixedly attached to the light-guide plate 21a and the transparent protective plate 11 by using an adhesive or the like to inhibit displacement thereof. When the liquid crystal display panel 20 is used as the display panel, the backlight apparatus 21 may be used as the supporting substrate. On the other hand, for example, when a display panel such as an organic ELD panel that does not need the backlight apparatus 21 including the light-guide plate 21a is used, the housing 30 may be used as the supporting substrate. When a touch panel without a display panel is used, the housing 30 may be used as the supporting substrate. When a touch panel without a display function of a display panel is used, a non-transparent protective plate may be used in place of the transparent protective plate 11.

The resilient supporting members 14 may be realized as, for example, stepped leaf springs. In a plan view from the operating surface 11a, the resilient supporting members 14 are attached such that one end fixed to the light-guide plate 21a and the other end fixed to the transparent protective plate 11 are offset from each other as illustrated in FIG. 2. The resilient supporting members 14 are arranged in a manner such as to support the transparent protective plate 11 and extend and contract in a direction diagonal to the thickness direction of the transparent protective plate 11. Preferably, each of the resilient supporting members 14a to 14d illustrated in FIG. 1 and FIG. 2 extends in a manner such that its end fixed to the transparent protective plate 11 moves toward the center P of the operating surface 11a in the X direction illustrated in FIG. 1. Also preferably, each of the resilient supporting members 14a to 14d illustrated in FIG. 1 and FIG. 2 contracts in such a manner that its end fixed to the transparent protective plate 11 moves away from the center P in the X direction. This configuration facilitates a seesaw-like vibration of the transparent protective plate 11 as described later. To that end, each of the resilient supporting members 14a to 14d is arranged with the end fixed to the transparent protective plate 11 being positioned closer to the center P than the end fixed to the light-guide plate 21a in the plan view of the operating surface 11a. Therefore, each of the resilient supporting members 14a to 14d is preferably arranged at an inclination angle of approximately 20° to 70° with respect to the surface of the light-guide plate 21a facing the liquid crystal display panel 20.

Figure 3A:
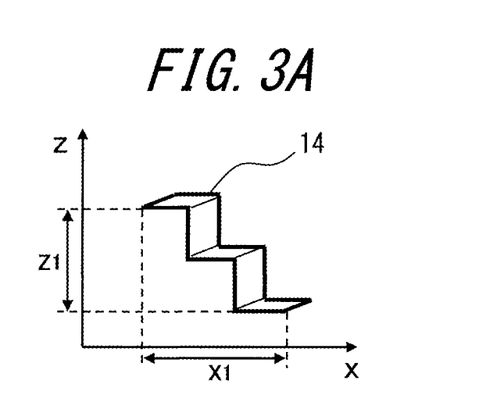
FIGS. 3A to 3C are graphs explaining extension and contraction of a resilient supporting member of the display apparatus of the first embodiment.
Figure 3B:
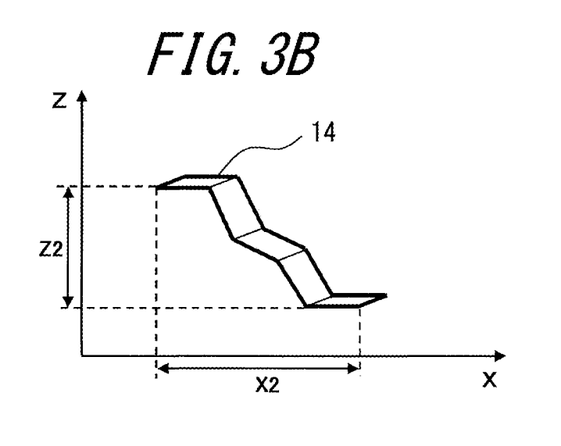
Figure 3C:
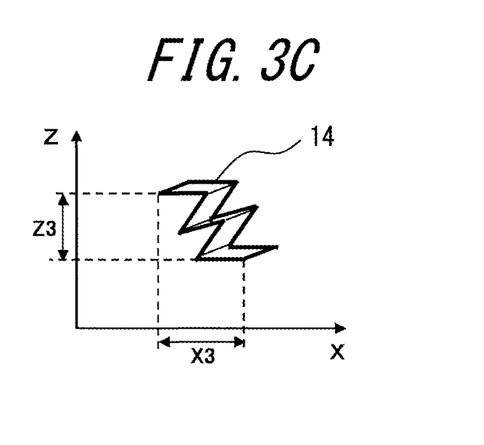

FIGS. 3A to 3C are graphs explaining the extension and contraction of the resilient supporting members 14 of the display apparatus according to the first embodiment. The X-axis and the Z-axis in the graphs correspond to the X direction and the Z direction, respectively, illustrated in FIG. 1 and FIG. 2. In a case in which the resilient supporting members 14 are configured as stepped leaf springs, FIG. 3A illustrates a non-vibrating state, FIG. 3B illustrates an extended state caused by vibration, and FIG. 3C illustrates a contracted state caused by vibration. As illustrated in FIG. 1 and FIG. 2, in the extended state caused by vibration, Z2>Z1 and X2>X1 are satisfied. As illustrated in FIG. 1 and FIGS. 3A to 3C, in the contracted state caused by vibration, Z3<Z1 and X3<X1 are satisfied. In this way, the resilient supporting members 14 finely extend and contract diagonally in the X direction and the Z direction. The resilient supporting members 14 may be formed from any members which diagonally extend and contract with respect to the thickness direction of the transparent protective plate 11. For example, the resilient supporting members 14 may be stepped leaf springs, leaf springs with bellows, or coil springs capable of diagonal extension and contraction.

When the resilient supporting members 14 are stepped leaf springs, the bend portions may be curved. This configuration can reduce damage to the bend portions when vibration with excessive amplitude is applied to the resilient supporting members 14 or when the resilient supporting members 14 vibrate for a long period. In order to further reduce damage to the bend portions, the cross-sectional shape of the bend portion has a partial arc shape with a length that exceeds a quarter (25%) of the circumferential length and is smaller than the circumferential length. That is, the partial arc shape preferably expands outward from a virtual corner formed by stepped extending surfaces in a plate-like shape adjacent to each other that are approximately orthogonal to each other. This configuration increases the length of the bend portion and an area to be elastically deformed by vibration and improves durability of the bend portion. Thus, damage to the bend portions is reduced, and the life of the resilient supporting members 14 is extended. For a similar purpose, the bend portion and its surrounding area may be thicker or wider than other plate-like portions. Further, the configuration in which the bend portion has a curved surface, the configuration in which the bend portion and its surrounding area is thicker than the other plate-like portion, and the configuration in which the bend portion and its surrounding area is wider than the other plate-like portion may be appropriately combined.

In FIG. 1, L1 is a straight line representing an axis of symmetry extending in the X direction passing through the center P of the operating surface 11a, and L2 is a straight line representing an axis of symmetry extending in the Y direction passing through the center P. The resilient supporting member 14a and the resilient supporting member 14c are arranged in a line-symmetrical manner with respect to the straight line L1. The resilient supporting member 14a and the resilient supporting member 14b are arranged in a line-symmetrical manner with respect to the straight line L2. The resilient supporting member 14b and the resilient supporting member 14d are arranged in a line-symmetrical manner with respect to the straight line L1. The resilient supporting member 14c and the resilient supporting member 14d are arranged in a line-symmetrical manner with respect to the straight line L2. The resilient supporting members 14 can be displaced in the Z direction and the X direction illustrated in FIG. 1 but are attached in a manner such as to inhibit displacement in the Y direction. The resilient supporting members 14 may be attached in a manner such as to allow displacement in the Z direction and the Y direction. The resilient supporting members 14 may be attached in a manner such as to allow displacement in the X direction, the X direction, and the Y direction. In this case, for example, each of the resilient supporting members 14a, 14b, 14c, and 14d is arranged being inclined in a plan view in such a manner as to be displaced in directions approximately toward and away from the center P in the plan view.

Figure 4A:
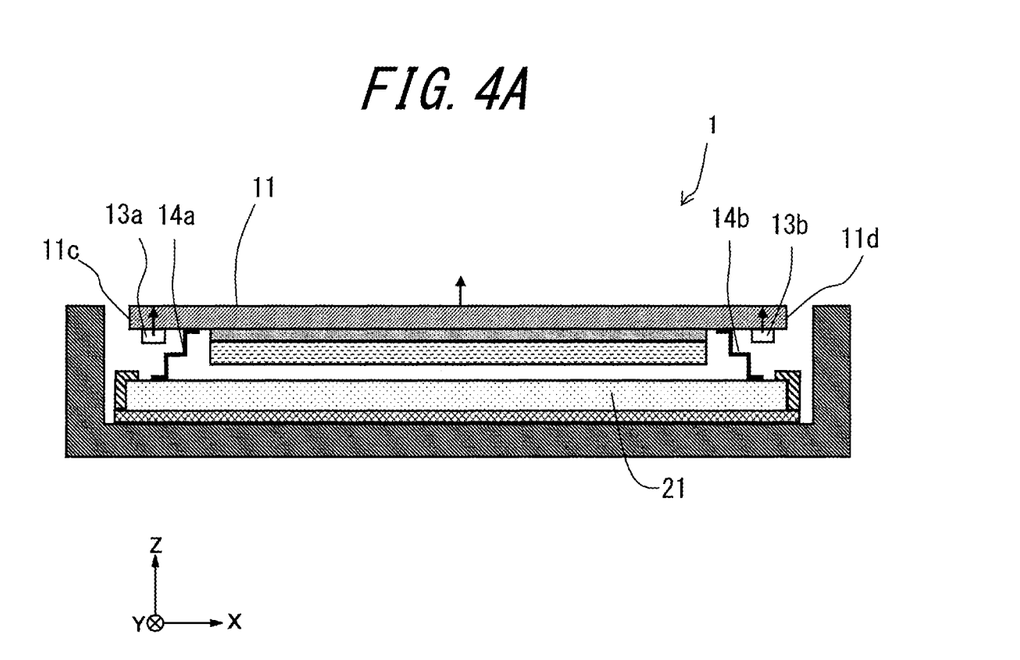
FIGS. 4A and 4B are cross-sectional diagrams illustrating in-phase vibration of the display apparatus of the first embodiment.
Figure 4B:
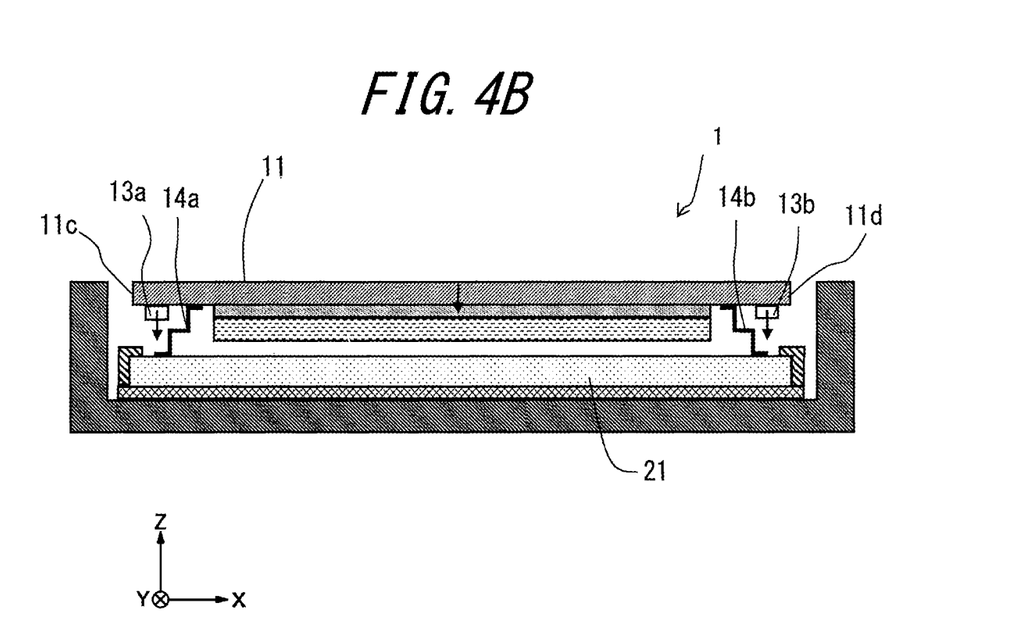

FIG. 4A and FIG. 4B are cross-sectional diagrams illustrating in-phase vibration of the display apparatus of the first embodiment. FIG. 4A illustrates a state in which the vibrators 13a and 13b are activated in-phase with the same amplitude, and the transparent protective plate 11 is displaced upward (in the positive Z-axis direction). FIG. 4B illustrates a state in which the vibrators 13a and 13b are operated in-phase with the same amplitude, and the transparent protective plate 11 is displaced downward (in the negative Z-axis direction. When the two vibrators 13a and 13b vibrate in-phase as described above, the transparent protective plate 11 can uniformly vibrate in its entirety in the Z direction, i.e., the thickness direction of the transparent protective plate 11.

Figure 5A:
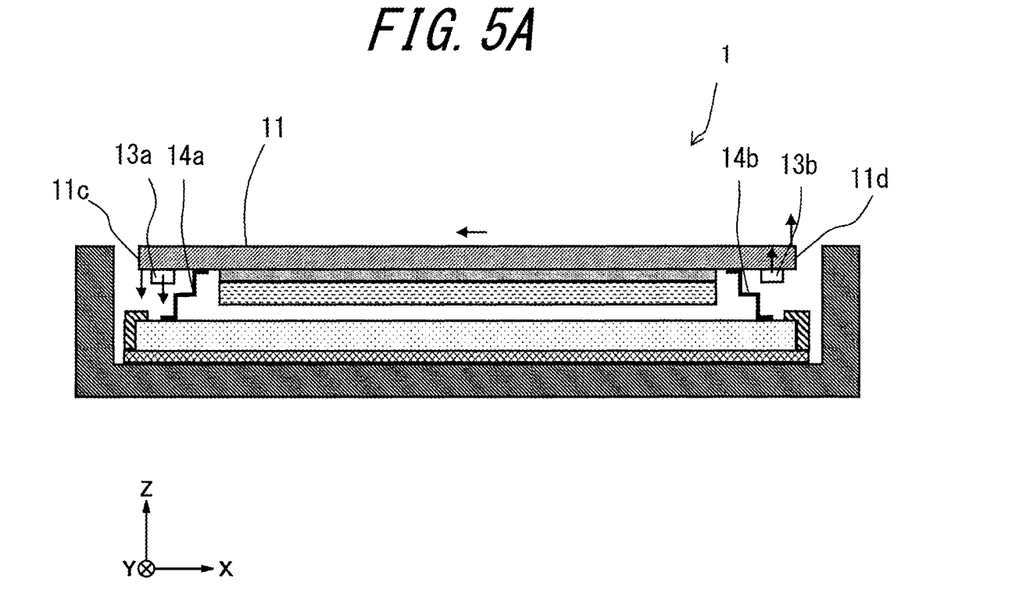
FIGS. 5A and 5B are cross-sectional diagrams illustrating out of phase vibration of the display apparatus of the first embodiment.
Figure 5B:
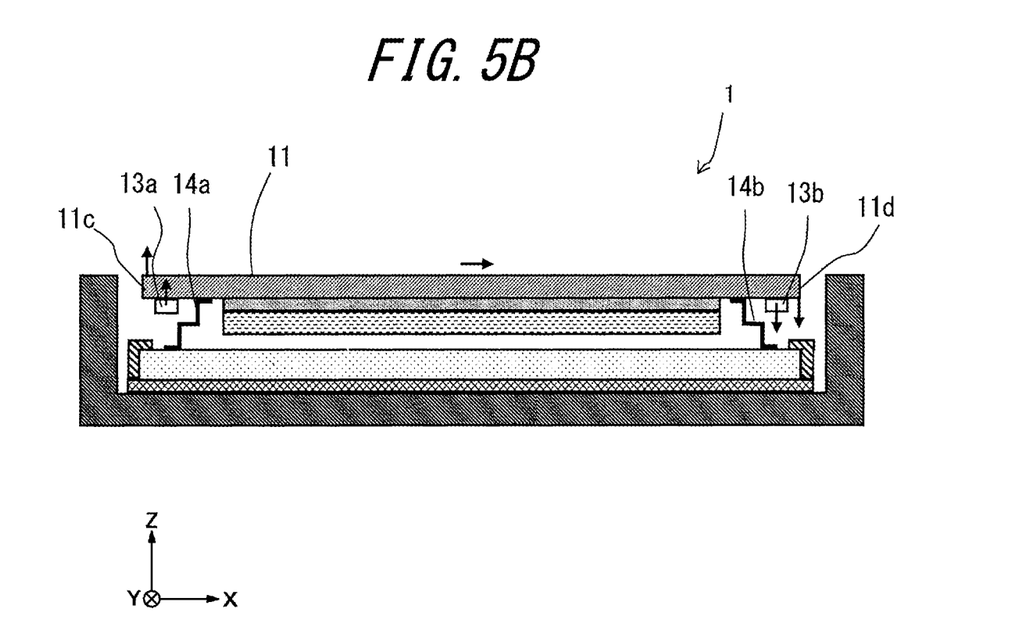

FIGS. 5A and 5B are cross-sectional diagrams illustrating out-of-phase vibration of the display apparatus of the first embodiment. As illustrated in FIG. 5A and FIG. 5B, the vibrators 13a and 13b may be vibrated out-of-phase with the same amplitude. In this case, the transparent protective plate 11 vibrates in a so-called seesaw-like manner by virtue of the spring force of the resilient supporting members 14 acting in diagonal directions. That is, in FIG. 5A, when the side 11c of the transparent protective plate 11 having the vibrator 13a attached thereto is displaced downward (in the negative Z-axis direction), the side 11b of the transparent protective plate 11 having the vibrator 13b attached thereto is displaced upward (in the positive Z-axis direction). At this time, the resilient supporting members 14a and 14c are displaced in the lower left direction (negative X-axis direction and negative Z-axis direction), and the resilient supporting members 14b and 14d are displaced in the upper left direction (negative X-axis direction and positive Z-axis direction). Thus, the transparent protective plate 11 becomes inclined from the upper right direction to the lower left direction and is displaced leftward (in the negative X-axis direction). In FIG. 5B, next, when the side 11c of the transparent protective plate 11 having the vibrator 13a attached thereto is displaced upward (in the positive Z-axis direction), the side 11b of the transparent protective plate 11 having the vibrator 13b attached thereto is displaced downward (in the negative Z-axis direction). At this time, the resilient supporting members 14a and 14c are displaced in the upper right direction (the positive X-axis direction and the positive Z-axis direction), and the resilient supporting members 14b and 14d are displaced in the lower right direction (positive X-axis direction and negative Z-axis direction). Thus, the transparent protective plate 11 is inclined from the upper left direction to the lower right direction and displaced rightward (in the positive X-axis direction). By repeating the operations of FIG. 5A and FIG. 5B, the transparent protective plate 11 vibrates in a seesaw-like manner. Thus, the operator can feel the vibration in the X direction along the surface of the transparent protective plate 11 and the Z direction. Especially in the central portion (in the vicinity of the straight line L2) of the transparent protective plate 11, there is little vibration in the Z direction, i.e., the thickness direction of the transparent protective plate 11, and the transparent protective plate 11 vibrates in the X direction along the surface thereof.

In the out-of-phase vibration illustrated in FIG. 5A and FIG. 5B, the phase of the vibration of the vibrator 13a and the phase of the vibration of the vibrator 13b may not be perfectly out-of-phase (phase with a phase angle of 180°, i.e., π radian). In this case, vibration can be generated in the central portion (in the vicinity of the straight line L2) of the transparent protective plate 11. A phase angle representing a difference between the phase of the vibration of the vibrator 13a and the phase of the vibration of the vibrator 13b may be approximately 60° to 300°, or approximately 90° to 270° (excluding 180° when vibration is to be generated in the central portion of the transparent protective plate 11, i.e., in the vicinity of the straight line L2). From the viewpoint of increasing vibration in the central portion of the transparent protective plate 11, the phase difference is preferably approximately 60° to 120° and 240° to 300°, and more preferably approximately 90° or approximately 270°.

In order to generate the vibration in the seesaw-like manner described above, any one of the vibrators 13a and 13b may be vibrated. In this case, the electric power to drive the vibrators 13 is saved, and the vibration efficiency is improved. Also, the number of vibrations of the vibrators 13 per unit time is reduced, and thus a total mechanical load applied to the vibrators 13 is reduced. As a result, the life of the vibrators 13 can be extended. For example, in order to operate in a manner similar to the operation of FIG. 5A, the vibrator 13a alone is vibrated such that the side 11c is displaced downward (in the negative Z-axis direction). Alternatively, the vibrator 13b alone is vibrated such that the side 11d is displaced upward (in the positive Z-axis direction). On the other hand, in order to operate in a manner similar to the operation of FIG. 5B, the vibrator 13a alone is vibrated such that the side 11c is displaced upward (in the positive Z-axis direction). Alternatively, the vibrator 13b alone is vibrates such that the side 11d is displaced downward (in the negative Z-axis direction).

Thus, for example, an operation to vibrate the vibrator 13a alone and displace the side 11c upward (in the positive Z-axis direction) is performed (operation a), followed by an operation to stop driving the vibrator 13a and displace the side 11c downward (in the negative Z-axis direction) to the original state (operation b). Next, an operation to vibrate the vibrator 13b alone and displace the side 11d upward (in the positive Z-axis direction) is performed (operation c), followed by an operation to stop driving the vibrator 13b and displace the side 11d downward (in the negative Z-axis direction) to the original state (operation d). The operations a to d described above may be sequentially performed in a repeating manner. In this case, the operations b and c may be performed simultaneously, and the operations d and a may be performed simultaneously.

Alternatively, an operation to vibrate the vibrator 13a alone and displace the side 11c downward (in the negative Z-axis direction) is performed (operation e), followed by an operation to stop driving the vibrator 13a and displace the side 11c upward (in the positive Z-axis direction) to the original state (operation f). Next, an operation to vibrate the vibrator 13b alone and displace the side 11d downward (in the negative Z-axis direction) is performed (operation g), followed by an operation to stop driving the vibrator 13b and displace the side 11d upward (in the positive Z-axis direction) to the original state (operation h). The operations e to h described above may be sequentially performed in a repeating manner. In this case, the operations f and g may be performed simultaneously, and the operations h and e may be performed simultaneously.

The resilient supporting members 14 are configured to extend and contract diagonally with respect to the thickness direction of the transparent protective plate 11. Thus, the resilient supporting members 14 can generate vibration in the thickness direction (the Z direction) of the transparent protective plate 11 and a surface direction (the X direction and/or the Y direction) of the transparent protective plate 11. That is, the display apparatus according to the present embodiment can generate various vibrations without increasing the number of the vibrators 13. For example, if vibrations are to be generated in both the thickness direction (the Z direction) and the surface directions (the X direction and the Y direction) of the transparent protective plate 11, at least three pairs of vibrators, i.e., six vibrators would be necessary. However, the display apparatus according to the present embodiment can generate, for example, vibration in the Z direction and vibration in the X direction by using one pair of vibrators, i.e., the vibrators 13a and 13b. Further, the display apparatus according to the present embodiment can provide various types of vibrations to the transparent protective plate 11 by varying the phases of the vibrations of the two vibrators 13. Accordingly, the display apparatus according to the present embodiment can provide various tactile sensations to the operator touching the transparent protective plate 11.

Second Embodiment

Figure 6:
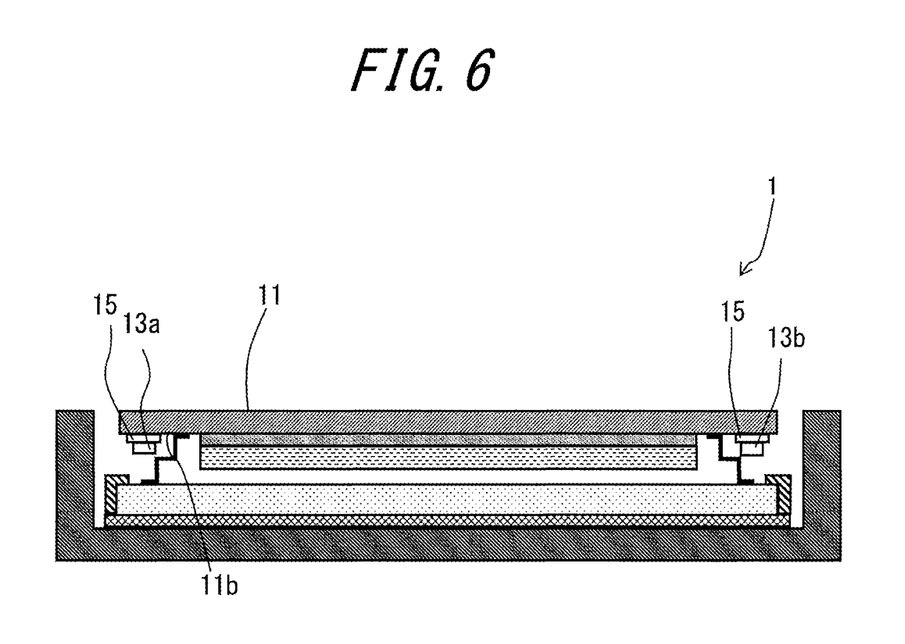
FIG. 6 is a cross-sectional diagram illustrating a display apparatus of a second embodiment.

FIG. 6 is a cross-sectional diagram illustrating a display apparatus according to a second embodiment. The display apparatus according to the second embodiment is different from the display apparatus according to the first embodiment illustrated in FIG. 2 in terms of including vibration transmitting members 15. In a manner similar to the first embodiment, the vibrators 13 may be directly attached to the rear surface 11b of the transparent protective plate 11. Alternatively, the vibrators 13 may be attached to the vibration transmitting members 15 so as to transmit vibration to the transparent protective plate 11 via the vibration transmitting members 15 as described in the present embodiment.

The vibration transmitting member 15 may be made of metal such as aluminum, stainless steel, or brass (copper-zinc alloy), resin such as silicone resin (silicone rubber), acrylic resin, epoxy resin, polyimide, polycarbonate, or polyethylene terephthalate (PET), porous resin such as porous urethane resin, rubber, sponge, ceramic such as alumina ceramic, or the like. The vibration transmitting members 15 may be formed from a resilient member such as a coil spring or a leaf spring. In this case, by virtue of the resilient property of the coil spring or the leaf spring, the vibration transmitting member 15 may suppress attenuation of vibration to be transmitted to the transparent protective plate 11.

The display apparatus according to the second embodiment includes the vibration transmitting members 15 between the vibrators 13 and the transparent protective plate 11. In the display apparatus according to the second embodiment configured as described above, vibration of a large amplitude is inhibited from being directly transmitted to the transparent protective plate 11. Thus, the display apparatus of the second embodiment is advantageous in that appropriately attenuates large vibrations down to fine vibrations. According to the display apparatus of the second embodiment, further, unnecessary stress applied to the vibrator 13 during vibration is reduced. Thus, the display apparatus according to the second embodiment extends the life of the vibrators 13.

Third Embodiment

Figure 7:
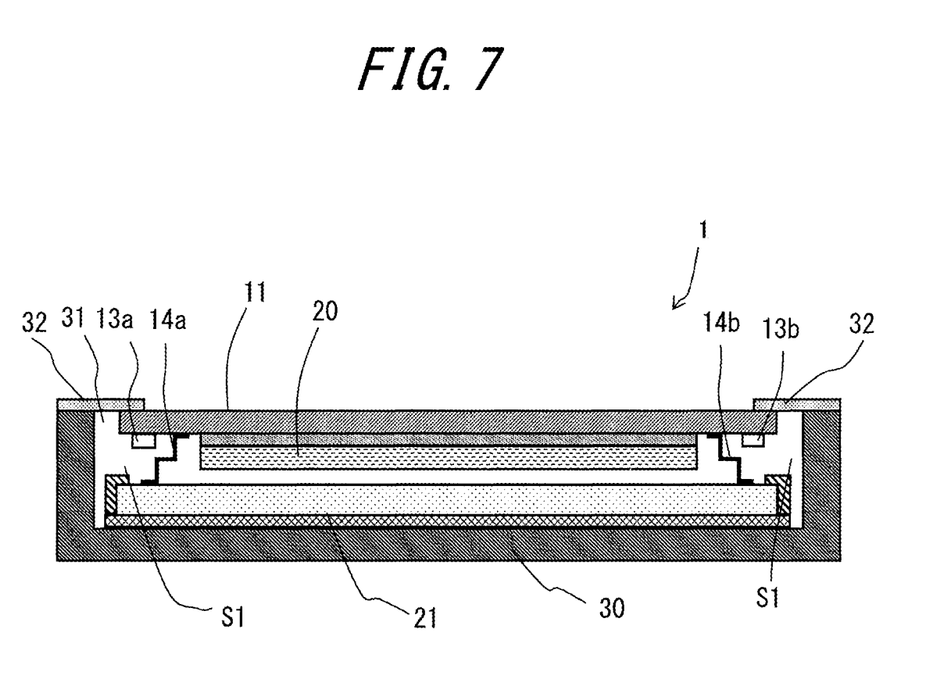
FIG. 7 is a cross-sectional diagram illustrating a display apparatus of a third embodiment.

FIG. 7 is a cross-sectional diagram illustrating a display apparatus according to a third embodiment. The display apparatus according to the third embodiment is different from the display apparatus according to the first embodiment illustrated in FIG. 2 in terms of including flexible sealing members. The display apparatus according to the third embodiment seals a space 31 between the transparent protective plate 11 and the housing 30 by using the flexible sealing members 32. Thus, the display apparatus according to the third embodiment realizes a dust-proof structure for preventing dust or dirt in the external environment from entering. The flexible sealing members 32 are films or sheets made of urethane foam (product name "PORON" manufactured by ROGERS INOAC CORPORATION), sponge, silicone resin (silicone rubber), or the like that serves as a flexible material for suppressing attenuation of vibration and attached by using an adhesive or the like. The flexible sealing members 32 may be adhesive sheets configured as a combination of a sheet and an adhesive. In order to flexibly respond to changes in the external environmental temperature or atmospheric pressure, the flexible sealing members 32 may have fine pores through which dust cannot pass. For example, HEPA (High Efficiency Particulate Air) filters having a particle collection efficiency of more than 99.97% with respect to dust particles with approximately 0.3 diameters and a performance of an initial pressure loss of 245 Pa or less (defined by JISZ8122) may be used as the flexible sealing members 32. The HEPA filter is one type of air filters used for the purpose of cleaning the air by removing dirt and dust therefrom and serves as an air purifier filter for a clean room filter.

In the display apparatus according to the third embodiment, the transparent protective plate 11 and the liquid crystal display panel 20 are enclosed in the housing 30. In the display apparatus according to the third embodiment, also, the space 31 between the transparent protective plate 11 and the housing 30 is sealed by the flexible sealing members 32. Thus, the display apparatus according to the third embodiment can form a dust-proof structure that tightly seals a space S1 within the housing 30. When the space S1 is sealed by a high rigidity material, the pressure change in the space S1 caused by the vibration of the transparent protective plate 11 is increased, and the vibration energy is likely to be transmitted to portions other than the transparent protective plate 11. In this case, there is a risk of attenuating vibration of the transparent protective plate 11. According to the present embodiment, because the flexible sealing members 32 are deformed, the pressure change of the air in the space S1 caused by the vibration of the transparent protective plate 11 is reduced. According to the display apparatus of the third embodiment, thus, the vibration of the transparent protective plate 11 is less likely to be transmitted to other portions, and attenuation of the vibration of the transparent protective plate 11 can be suppressed. Further, the flexible sealing members 32 may be porous in a breathable manner to a certain degree as described above. In this case, by lowering the airtightness of the space S1, the space S1 is ventilated when the volume of the air in the space S1 expands and contracts due to the vibration of the transparent protective plate 11, and thus the pressure change in the space S1 caused by the vibration of the transparent protective plate 11 is reduced. Accordingly, by using the flexible sealing members 32 that are breathable, a deterioration of the vibration efficiency of the transparent protective plate 11 may be suppressed.

Fourth Embodiment

Figure 8:
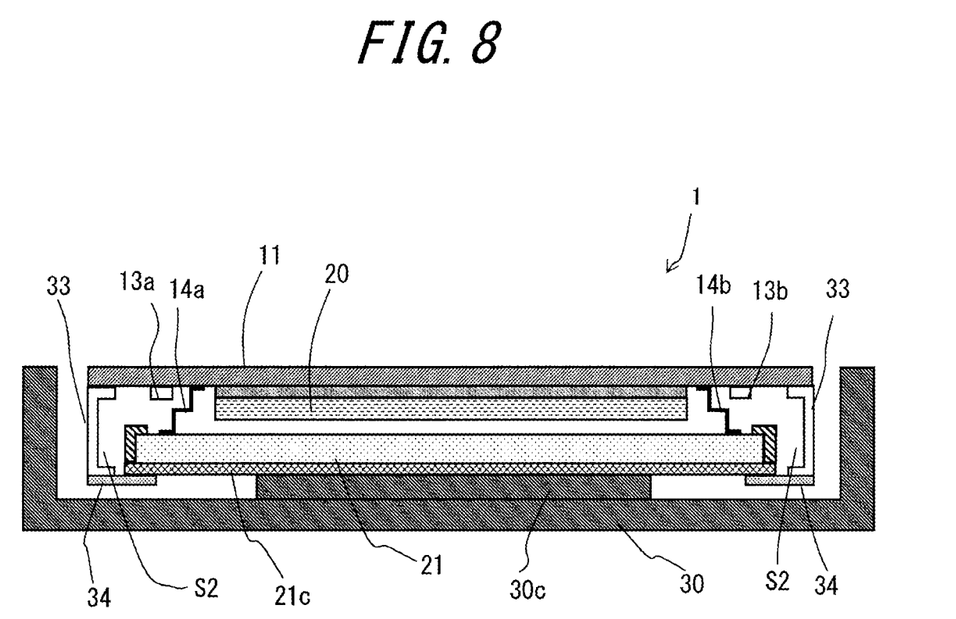
FIG. 8 is a cross-sectional diagram illustrating a display apparatus of a fourth embodiment.

FIG. 8 is a cross-sectional diagram illustrating a display apparatus according to a fourth embodiment. The display apparatus according to the fourth embodiment is different from the display apparatus according to the first embodiment illustrated in FIG. 2 in terms of the backlight apparatus 21 being arranged on a pedestal 30c disposed on the bottom surface 30a of the housing 30. The display apparatus according to the fourth embodiment is also different from the display apparatus according to the first embodiment illustrated in FIG. 2 in terms of flexible sealing members 34 being attached to the backlight apparatus 21. As illustrated in FIG. 8, the pedestal 30c is disposed on the bottom surface 30a of the housing 30. The pedestal 30c may be formed by a portion of the housing 30. The backlight apparatus 21 is adhered onto the pedestal 30c by using an adhesive or the like. The pedestal 30c is arranged within the backlight apparatus 21 in the plan view in the Z-axis direction. This yields a space between the periphery of the backlight apparatus 21 and the housing 30. As illustrated in FIG. 8, also, a frame-like body 33 is fixed to the periphery of the transparent protective plate 11. The frame-like body 33 is fixed to the periphery of the rear surface 11b of the transparent protective plate 11 and surrounds side surfaces of the backlight apparatus 21. The flexible sealing members 34 are arranged between the periphery of the conductive plate 21c of the backlight apparatus 21 and the periphery of the frame-like body 33. The flexible sealing members 34 seal a space S2 surrounded by the transparent protective plate 11, the frame-like body 33, and the backlight apparatus 21.

In the display apparatus according to the fourth embodiment, the space S2 surrounded by the transparent protective plate 11, the frame-like body 33, and the backlight apparatus 21 is sealed. Thus, the display apparatus according to the fourth embodiment can form a dust-proof structure that tightly seals the space S2. When the space S2 is sealed by a high rigidity material, the pressure change in the space S2 caused by the vibration of the transparent protective plate 11 increases, and the vibration energy is likely to be transmitted to portions other than the transparent protective plate 11. In this case, there is a risk of attenuating vibration of the transparent protective plate 11. According to the present embodiment, however, because the flexible sealing members 34 are deformed, the pressure change in the space S2 caused by the vibration of the transparent protective plate 11 is reduced. According to the display apparatus of the fourth embodiment, thus, the vibration of the transparent protective plate 11 is less likely to be transmitted to other portions, and attenuation of the vibration of the transparent protective plate 11 can be suppressed. Further, the flexible sealing members 34 may be porous in a breathable manner to a certain degree. In this case, by lowering the airtightness of the space S2, the space S2 is ventilated when the volume of the air in the space S2 expands and contracts due to the vibration of the transparent protective plate 11, and the pressure change in the space S2 caused by the vibration of the transparent protective plate 11 is reduced. Accordingly, a deterioration of the vibration efficiency of the transparent protective plate 11 may be suppressed.

Fifth Embodiment

Figure 9:
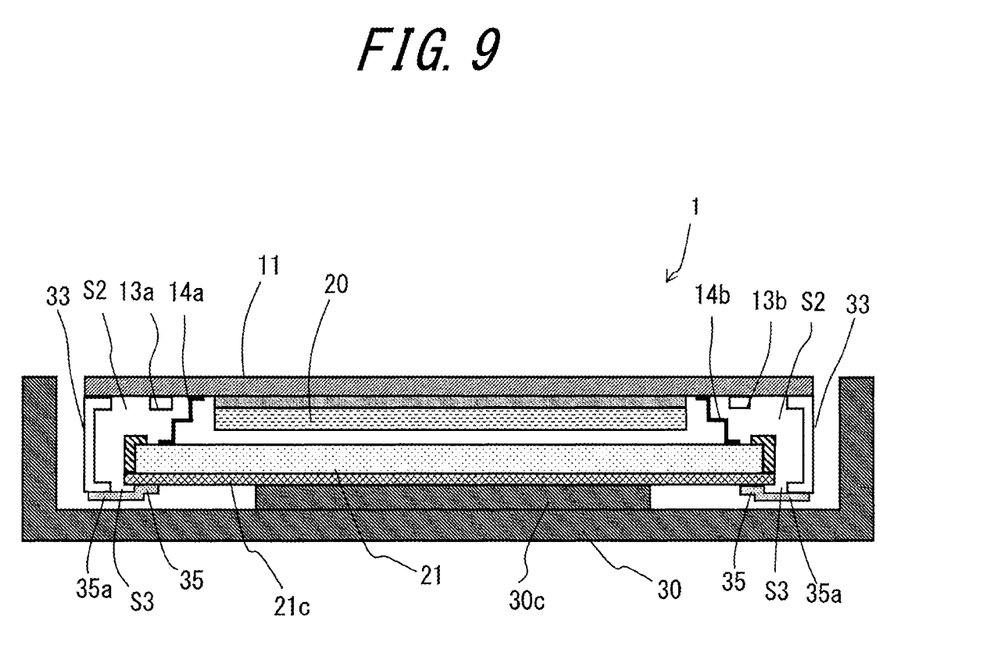
FIG. 9 is a cross-sectional diagram illustrating a display apparatus of a fifth embodiment.

FIG. 9 is a cross-sectional diagram illustrating a display apparatus according to a fifth embodiment. The display apparatus according to the fifth embodiment is different from the display apparatus according to the fourth embodiment illustrated in FIG. 8 in terms of including flexible sealing members 35 each having a bend (a step) that bends in a manner extending toward the bottom surface 30a of the housing 30. The flexible sealing members 35 seal the space S2 surrounded by the transparent protective plate 11, the frame-like body 33, and the backlight apparatus 21. The flexible sealing members 35 are arranged between the periphery of the conductive plate 21c of the backlight apparatus 21 and the periphery of the frame-like body 33. Each of the flexible sealing members 35 includes a bend 35a that bends in a manner extending toward the bottom surface 30a. In the display apparatus according to the fifth embodiment, the bend 35a adds a space S3 to the space S2. In the display apparatus according to the fifth embodiment, when the vibrators 13a and 13b vibrate in-phase, the volume of the space S3 expands and contracts, inhibiting the volume change of the space S2. Thus, in the display apparatus according to the fifth embodiment, deterioration of the vibration efficiency of the transparent protective plate 11 caused by the expansion and contraction of the volume of the air in the space S2 can be further suppressed. Also, when the transparent protective plate 11 vibrates in the seesaw-like manner as described above, because the space S3 on the side of one of the vibrators expands while the space S3 on the side of the other vibrator contracts, the volume change of the air in the space S2 is reduced. In this case, the air pressure change is reduced, and deterioration of the vibration efficiency of the transparent protective plate 11 can be suppressed.

According to the embodiments illustrated in FIG. 7 to FIG. 9, for cases in which there is a sealed space on the rear side of the transparent protective plate 11, the vibration method may reduce the volume change of the space caused by vibration of the transparent protective plate 11. For example, when the sealed space is formed and the two vibrators 13 generate out-of-phase vibrations, a change in the air volume in the sealed space is reduced. Thus, deterioration of the vibration efficiency of the transparent protective plate 11 caused by the expansion and contraction of the air volume in the sealed space may be suppressed.

For example, a case in which two vibrators 13 generate out-of-phase vibrations as illustrated in FIG. 5A and FIG. 5B will be considered. Here, for example, the transparent protective plate 11 is assumed to have a rectangular shape with a longitudinal length of 250 mm and a transverse length of 100 mm. Also, the vibration amplitude of one of the vibrators 13 is assumed to be approximately 50 μm. In this case, when the two vibrators 13a and 13b are driven in-phase as illustrated in FIG. 4A and FIG. 4B, there is an approximately 1.5 cc expansion and contraction of the air in the sealed space. However, when the two vibrators 13a and 13b are driven out-of-phase as illustrated in FIG. 5A and FIG. 5B, the expansion and contraction of the air the sealed space can be reduced to approximately 0 cc. In this case, accordingly, it is not necessary to increase electric power for driving the vibrators 13 because of the expansion and contraction of the air in the sealed space.

Although the embodiments of the present disclosure have been described above in detail, the present disclosure is not limited thereto and may be altered or amended in a variety of manners without departing from the substance of the present disclosure.

REFERENCE SIGNS LIST 1 liquid crystal display apparatus
10 touch panel
11 transparent protective plate
11a operating surface
12 contact detection unit
13, 13a, 13b vibrator
14, 14a, 14b, 14c, 14d resilient supporting member
15 vibration transmitting member
20 liquid crystal display panel
21 backlight apparatus
21a light-guiding plate
21b frame
21c conductive plate
30 housing
30a bottom surface
30b frame portion
30c pedestal
32, 34, 35 flexible sealing member
33 frame-like body

The invention claimed is:
1. A touch panel comprising:
a supporting substrate;
a protective plate that is arranged spaced apart from the supporting substrate and includes an operating surface facing away from the supporting substrate;
a plurality of vibrators for vibrating the protective plate; and
a resilient supporting member arranged between the supporting substrate and the protective plate to support the protective plate and extend and contract diagonally across a thickness direction of the protective plate, and
wherein the resilient supporting member changes a displacement direction of the protective plate into a direction different from a displacement direction of the plurality of vibrators,
wherein the plurality of vibrators includes two vibrators arranged along respective opposing sides of the protective plate,
wherein the resilient supporting member includes two resilient supporting members arranged adjacent to the respective opposing sides of the protective plate,
when one side of the opposing sides of the protective plate is displaced downward, one of the two resilient supporting members displaces an other side of the opposing sides of the protective plate upward, and
when one side of the opposing sides of the protective plate is displaced upward, one of the two resilient supporting members displaces an other side of the opposing sides of the protective plate downward.

2. The touch panel according to claim 1, comprising:
a vibration transmitting member arranged between the vibrators and the protective plate.

3. The touch panel according to claim 1,
wherein the protective plate has a rectangular surface, and
the plurality of vibrators includes two vibrators arranged along respective opposing sides of the rectangular surface in a point-symmetrical manner with respect to a center of the rectangular surface.

4. The touch panel according to claim 3,
wherein the two vibrators generate mutually out-of-phase vibrations.

5. A display apparatus comprising:
the touch panel according to claim 1 in which the protective plate is transparent; and
a display panel arranged between the protective plate and the supporting substrate.

6. The display apparatus according to claim 5, comprising:
a housing enclosing the protective plate and the display panel; and
a flexible sealing member for sealing a space between the protective plate and the housing.

7. The display apparatus according to claim 5,
wherein the display panel is a liquid crystal display panel,
the display apparatus includes a backlight apparatus that is arranged spaced apart from the liquid crystal display panel on an opposite side of a display surface of the liquid crystal display panel, and a frame-like body surrounding side portions of the backlight apparatus, and
a flexible sealing member is arranged between a periphery of the backlight apparatus and a periphery of the frame-like body.

* * * * *